US006062296A

United States Patent [19]
Broberg

[11] Patent Number: 6,062,296
[45] Date of Patent: May 16, 2000

[54] REGENERATIVE HEAT RECOVERY UNIT COMPRISING HEAT ACCUMULATORS TILTABLY MOVABLE TO HAVE A VALVE FUNCTION

[76] Inventor: Bo Broberg, Box 103, S-196 23 Kungsangen, Sweden

[21] Appl. No.: 09/117,623
[22] PCT Filed: Jan. 31, 1997
[86] PCT No.: PCT/SE97/00153
   § 371 Date: Aug. 21, 1998
   § 102(e) Date: Aug. 21, 1998
[87] PCT Pub. No.: WO97/28412
   PCT Pub. Date: Aug. 7, 1997

[30] Foreign Application Priority Data

Feb. 2, 1996 [SE] Sweden ................... 9600390

[51] Int. Cl.⁷ .................................... F23L 15/02
[52] U.S. Cl. ................... 165/6; 165/10; 165/54; 165/293
[58] Field of Search ............ 165/54, 6, 4, 293, 165/8, 10

[56] References Cited

U.S. PATENT DOCUMENTS

| | | |
|---|---|---|
| 1,203,944 | 11/1916 | Weber ................................ 165/6 |
| 2,774,573 | 12/1956 | Holm ................................. 165/6 |
| 3,225,819 | 12/1965 | Stevens . |
| 3,368,327 | 2/1968 | Munters et al. ................ 165/4 X |
| 3,891,028 | 6/1975 | Penny . |
| 4,558,731 | 12/1985 | Pentikainen et al. . |
| 4,966,228 | 10/1990 | Fawcett ........................ 165/4 X |
| 5,439,048 | 8/1995 | Osman et al. . |
| 5,515,909 | 5/1996 | Tanaka . |

FOREIGN PATENT DOCUMENTS

| | | |
|---|---|---|
| 621 722 | 11/1935 | Germany . |
| 78 11288 | 5/1980 | Sweden . |
| 416 347 | 12/1980 | Sweden . |
| 523268 | 7/1976 | U.S.S.R. ........................ 165/6 |
| WO 90/01667 | 2/1990 | WIPO . |

Primary Examiner—Christopher Atkinson
Attorney, Agent, or Firm—Young & Thompson

[57] ABSTRACT

A heat recovery unit comprising a case (1), which encloses at least one regenerative heat accumulator (5), whereby the casing (1) has a supply air opening (10), an exhaust air opening (15), an exterior air opening (20) and a under-air opening (25), and whereby exhaust air and supply air alternately pass through the heat accumulator (5). The heat accumulator (5) has, via a rotational movement, a valve function which opens and respectively closes the openings (10–25) when the heat accumulator (5) rotates from a first position for exhaust air throughflow to a second position for exterior air throughflow.

13 Claims, 5 Drawing Sheets

REGENERATIVE HEAT RECOVERY UNIT COMPRISING HEAT ACCUMULATORS TILTABLY MOVABLE TO HAVE A VALVE FUNCTION

FIELD OF THE INVENTION

The present invention relates to a heat recovery unit comprising a casing which contains at least one regenerative heat accumulator, whereby the casing has an inlet air opening, an exhaust air opening, an exterior air opening and a used-air opening, and whereby the exhaust air and the exterior air alternately pass through the heat accumulator.

BACKGROUND OF THE INVENTION

Heat recovery units are used in, amongst others, ventilation systems for e.g. ventilating buildings and at the same time returning the heat out of the exhaust air which is ventilated out from the building to the exterior air which is fed into the building in the form of inlet air.

A heat recovery assembly which is present on the market, has two plate housings which each surround their own regenerative plate package which forms the heat accumulators. Each plate housing is mutually joined with two valve housings. Each valve housing comprises a valve leaf which are each influenced by their own valve motor. One of the valve housings is equipped with a supply air fan which is connected to a supply air channel on the valve housing, and with an exhaust air fan which is connected to an exhaust channel on the valve housing. The valve housing itself is connected to each and all of the plate housings via a supply air opening resp. an exhaust air opening on the respective plate housings. The second valve housing is equipped with a used-air channel and an exterior air channel and is connected to each of the plate housings via a used-air opening resp. an exterior air opening of the respective plate housings.

Exhaust air resp. exterior air passes alternately through the plate packages. When one of the plate packages has warmed up and the other has cooled, the valve leaves in the valve housings are switched over, whereby the exhaust resp. exterior air changes plate package and have the opposite direction of flow compared with the air which previously flowed in the respective plate packages.

Another existing heat recovery assembly is the rotation heat exchanger where a continuous airflow flows through a rotating cylinder. The axis of rotation of the cylinder extends into a plane which coincides with a wall. On one side of the wall, warm air flows and on the other side cold air flows. By letting the warm air pass through the cylinder, the part of the cylinder which is on the "warm" side is warmed up. When the cylinder rotates, the warmed up part of the cylinder will go over to the "cold" side, whereby the cold air which flows through the cylinder is warmed up.

OBJECTS OF THE INVENTION

The main object of the present invention is to achieve a heat recovery unit which is equipped with at least one regenerative heat accumulator, which eliminates the need of a separate cross-over valve, which controls the exhaust air and the exterior air which pass through the heat accumulators. Preferably two heat accumulators are coupled together to a heat recovery unit.

Another object of the present invention is to provide a heat recovery unit which has a very low sound change in the ventilation system when the switching over occurs from the exterior air to the exhaust air, and vice versa, in the heat accumulators.

A further object of the present invention is to provide possibility of recirculatory operation with the heat recovery unit, which recirculates the exhaust air through the supply air opening under special operating conditions.

A further object of the present invention is to provide that the air flows in the same direction through the openings in the casing, irrespective of the direction of the air through the heat accumulators.

A further object of the present invention is to provide a low pressure drop across the heat recovery unit.

A further object of the present invention is to provide a high degree of temperature exchange in the heat recovery unit.

A further objector of the present invention is to provide a heat recovery unit which permits simple cleaning.

SUMMARY OF THE INVENTION

According to the invention these objects are achieved by a heat recovery unit in which the heat accumulator, by means of a rotating movement, has a valve function which opens resp. closes said openings when the heat accumulator moves from a first position for exhaust air throughflow to a second position for exterior air throughflow.

BRIEF DESCRIPTION OF THE DRAWINGS

The invention will be described in more detail below by means of examples of embodiments with reference to the appended drawings.

DETAILED DESCRIPTION OF THE INVENTION

Figure 1:
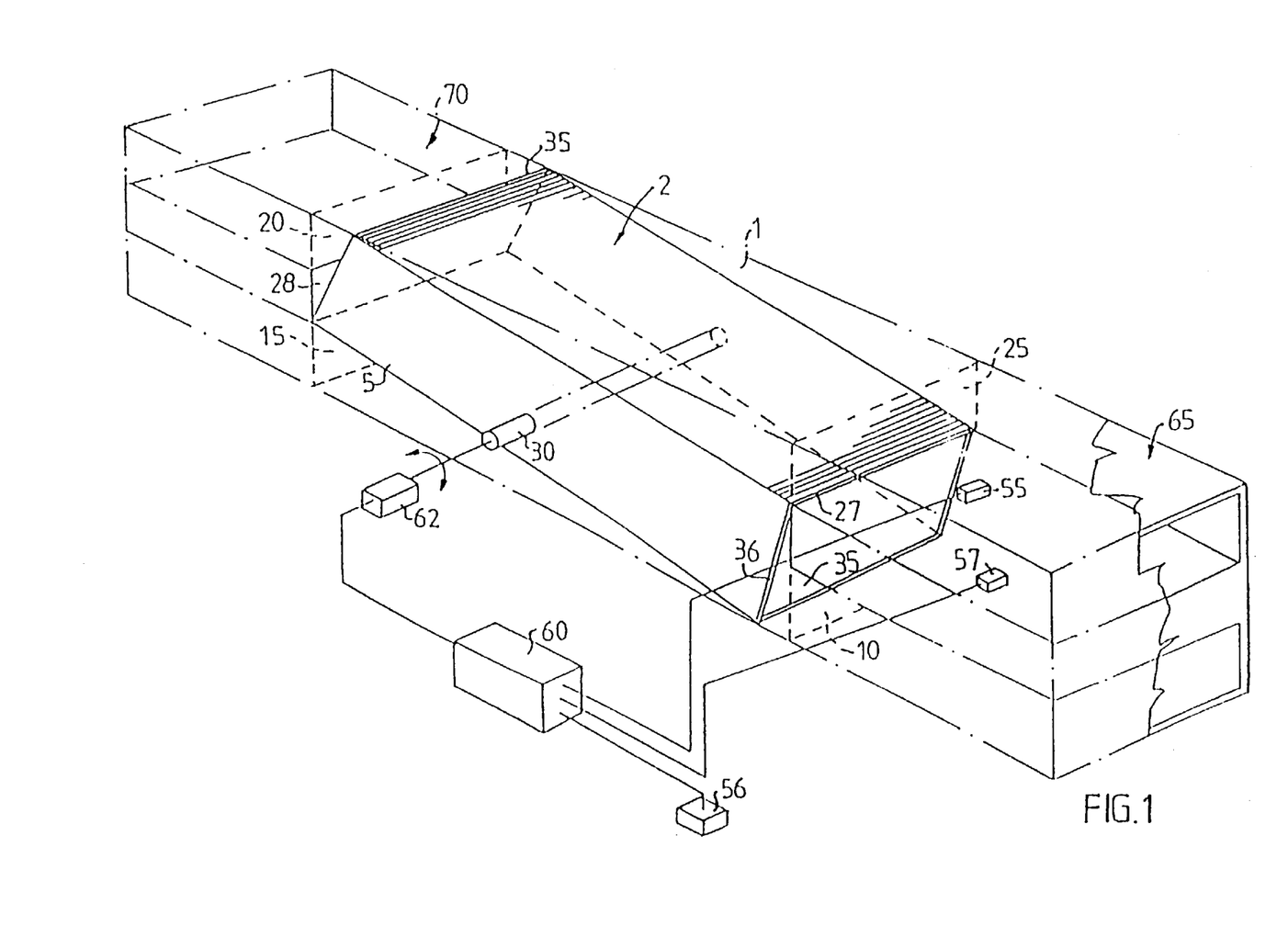
FIG. 1 shows a perspective view of a heat recovery unit according to a first embodiment.

FIG. 1 shows a perspective view of a heat recovery unit according to a first embodiment. The heat recovery unit comprises a casing 1 which forms a space 2, which contains a regenerative heat accumulator 5. According to this embodiment the casing 1 is elongated with a length which is greater than its width and height. The heat accumulator 5 which is placed inside the casing 1 has a length and a width which are somewhat less than the length and width of the space 2 which is formed by the casing 1 so that a clearance is formed between the inner surface of the casing 1 and the heat accumulator 5. The thickness of the heat accumulator 5 is less than the height of the space 2. This allows the heat accumulator 5 to rotate forwards and backwards inside the casing 1. The swinging movement takes place as a tipping movement around a shaft 30 which carries the heat accumulator 5. The shaft 30 passes through a hole in the casing 1 and is mounted in bearings in the casing 1 on both sides of the heat accumulator 5. In FIG. 1 the shaft 30 is imagined to be horizontal.

The casing 1 has ends at which a supply air opening 10, an exhaust air opening 15, an exterior air opening 20 and a used-air opening 25 are arranged, which each cooperate with end faces 35 of the heat accumulator 5. The end faces 35 are preferably parallel with the shaft 30 and planar and lie against the inside of the inner surfaces of the casing 1 around the openings 10–25. The supply air opening 10 and the used-air opening 25 resp. the exhaust air opening 15 and the exterior air opening 20 are separated by means of a wall part 27 resp. 28, which can be formed by part of the casing 1. In the embodiment shown, both of the end faces 35 have sealing strips 36 along their upper and lower edges. In a first position, shown in FIG. 1, the upper strip 36 of the lefthand end face 35 seals against the upper side of the casing 1, and the lower strip against the lower edge of the wall part 28, at the same time as the upper strip 36 of the righthand end face 35 seals against the upper edge of the wall part 27 and its lower strip seals against the inside of the bottom of the casing 1.

The heat accumulator can be built up from a number of plates 37 (FIG. 4) which forms a plurality of throughflow channels 38 for air. The throughflow channels 38 are preferably directed in the direction of the thickness of the heat accumulator 5. The plates 37 consequently form a large heat-absorbing resp. heat-emitting surface.

The heat recovery unit can be used in a ventilation system for ventilating a building, e.g. an apartment house or an office building. The air which leaves rooms in the building by the ventilation is called exhaust air and the air which is supplied to the rooms is called supply air.

By means of its forwards and backwards rotating movement the heat accumulator has a valve function which opens resp. closes said openings 10–25 when the heat accumulator 5 rotates from a first position for exhaust air throughflow to a second position for supply air throughflow.

With exhaust air throughflow, when the heat accumulator 5 is positioned in the first position, exhaust air at room temperature flows in through the exhaust air opening 15 and into the space 2 in which the heat accumulator 5 is positioned. The exhaust air room temperature flows subsequently through the heat accumulator 5 in a direction which substantially corresponds to the direction of its thickness. The heat accumulator 5 is thereby heated up by the throughflowing exhaust air. The exhaust air then flows out through the used-air opening 25 in the form of used air and subsequently leaves the space 2 in which the heat accumulator 5 is placed. The used air which leaves the used-air opening 25 can subsequently suitably flow into a channel 82 (FIG. 5), which transports the used air out of the building.

A first sensor 55 senses the temperature of the used air which leaves the used-air opening 25. A reference sensor 56 can, for example, be placed in the building which is to be ventilated, whereby the reference temperature will correspond to the room temperature in the building. The first sensor 55 and the reference sensor 56 are connected to a control unit 60. When the difference between the temperature which the first sensor 55 senses and the temperature which the second sensor 56 senses decreases to a predetermined value, the control unit 60 gives a signal to a stepping motor 62, which is connected to the shaft 30, whereby the motor 62 rotates the heat accumulator 5 to the second position for supply air throughflow. Instead of a stepping motor it is conceivable to use another power generating means such as a hydraulic or pneumatic cylinder.

During exterior air throughflow, exterior air flows in through the exterior air opening 20 and into the space 2 in which the heat accumulator 5 is positioned. The exterior air then flows through the heat accumulator 5 in a direction which substantially corresponds to the direction of its thickness. The exterior air is thereby heated up by the heat accumulator 5 warmed up by the exhaust air. The air then flows out through the supply air opening 10 in the form of supply air and consequently leaves the space 2 in which the heat accumulator 5 is positioned. The supply air which leaves the supply air opening 10 then flows either directly into the building or into a duct system (not shown) which distributes the air into the different rooms of the building.

A second sensor 57, which is placed by the supply air opening 10 and connected to the control unit 60 senses the temperature of the warmed up supply air. When the difference between the temperature which the second sensor 57 senses and the temperature which the reference sensor 56 senses increases to a predetermined value, the control unit 60 gives a signal to the stepping motor 62, whereby the motor 62 tips the heat accumulator 5 to the first position for exhaust air throughflow.

A fan part 65 which comprises two fans 66,67 (FIG. 4) can be connected to the supply air opening 10 and the used-air opening 25, and a filter part 70 which comprises two filters 71,72 can be connected to the exhaust air opening 15 and the exterior air opening 10.

Figure 4:
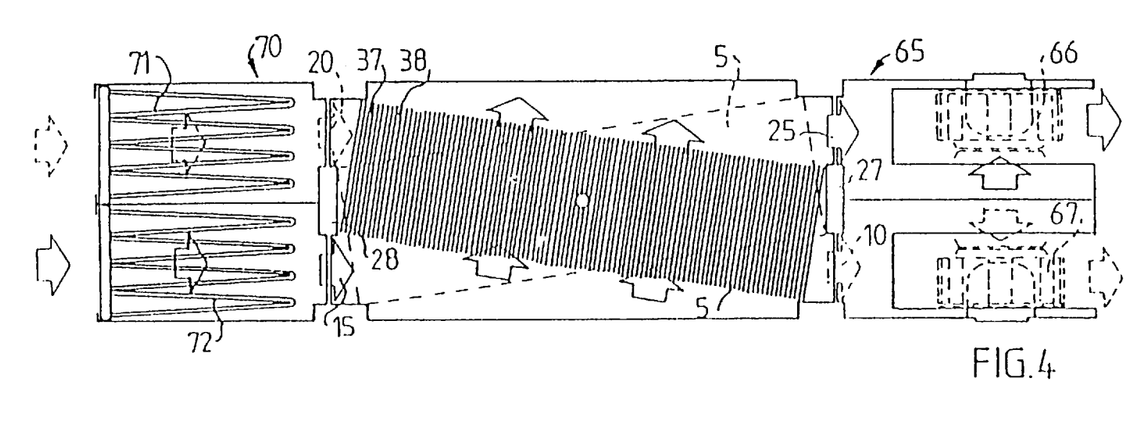
FIG. 4 shows a side view of a heat recovery unit according to the second embodiment.

When the heat accumulator 5 is heated up by the exhaust air throughflow, the exhaust air at room temperature will first meet one side, in FIG. 4 the lower side, of the heat accumulator 5. This first side of the heat accumulator 5 will have a higher temperature than the second side, if the heat accumulator 5 is rotated to the second position before the second side of the heat accumulator 5 has been able to achieve the same temperature as the first side.

According to the first embodiment in FIG. 1, the exhaust air and the supply air flow in opposite directions through the heat accumulator 5. This means that the exterior air first will meet the side of the heat accumulator 5 which has the lowest temperature. The exterior air will consequently be successively warmed up along its flow path through the heat accumulator 5, which increases the total efficiency of the heat recovery unit.

Figure 2:
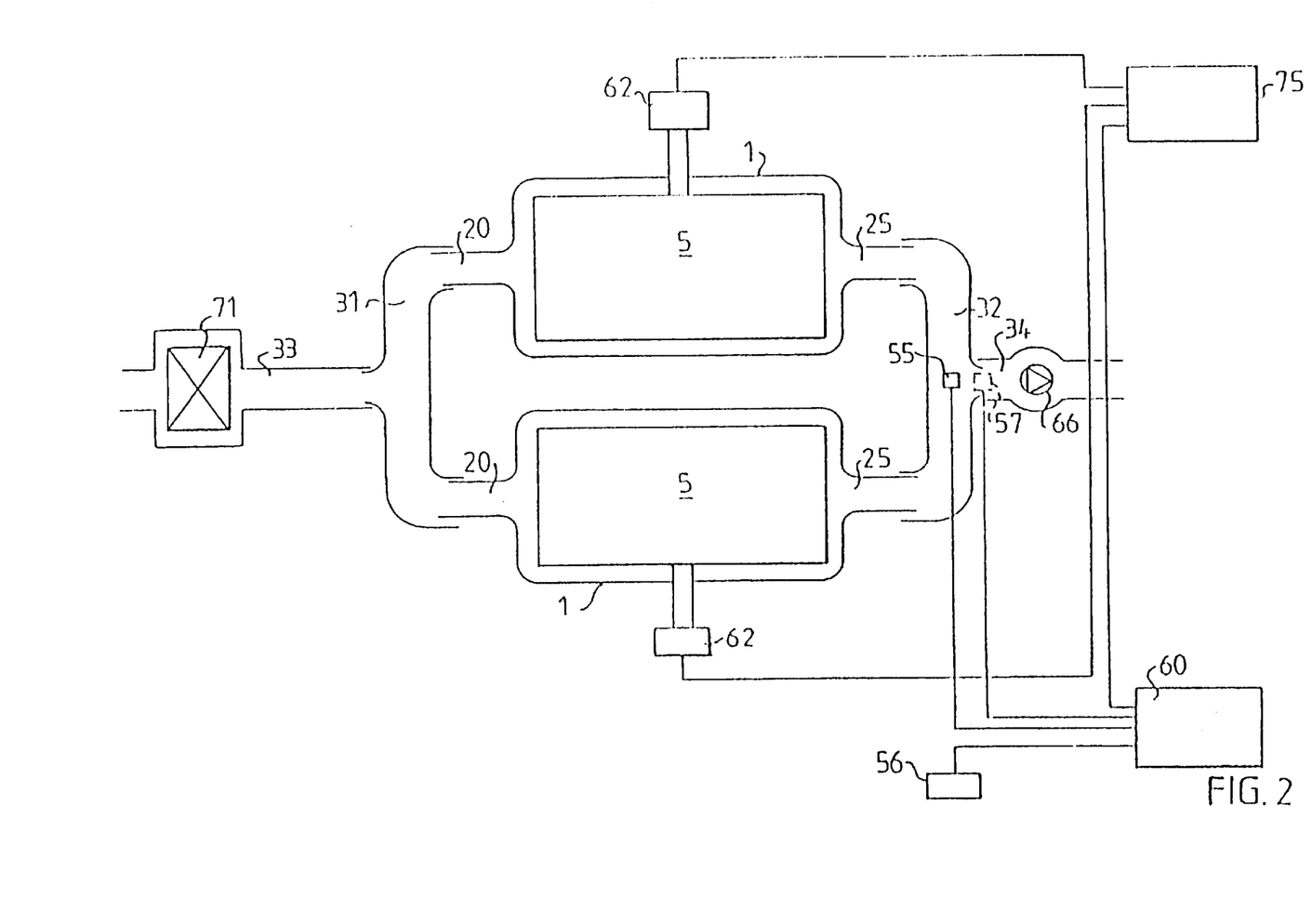
FIG. 2 shows a view from above of two heat recovery units which are coupled together to form a heat recovery assembly.

FIG. 2 shows a view from above of two heat recovery units according to FIG. 1, which are connected to form a heat recovery assembly. The exterior air openings 20 on each unit are coupled together by a tube 31, the exhaust air openings 15 are coupled together by a tube 31 (not shown), the used-air openings 25 are coupled together by a tube 32 and the supply air openings 10 are coupled together by a tube 32 (not shown). The tube 31, which is connected to the exterior air opening 20, discharges into an exterior air channel 33 in which a filter 71 is arranged. The tube 31, which is connected to the exhaust air openings 15 discharges in an exhaust air channel 33, in which a filter 72 is arranged (not shown). The tube 32 which is connected to the used-air openings 25 discharges into a common used-air channel 34, in which a fan 66 is arranged. The tube 32 which is connected to the supply air openings 10 discharges into a common supply air channel 34, in which a fan 67 is arranged (not shown).

The rotational movement of the heat accumulators 5 are so controlled that when the heat accumulator 5 of one of the heat recovery units is in the first position for exhaust air throughflow, the heat accumulator 5 of the second heat recovery unit is in the second position for exterior air throughflow, and vice versa.

In this way the ventilation in for example a building can be increased compared with only one heat recovery unit, whereby a nearly continuous ventilation of the building is achieved. Each of the heat recovery units can be equipped with its own stepping motor 62 which brings about the rotationary movement of the respective heat accumulator 5. In this case the motors 62 should be synchronized so that when one of the heat accumulators 5 is in the first position, the second heat accumulator 5 should be in the second position. This synchronization can be performed with a control means 75. Alternately, the heat recovery assembly can be equipped with only one motor, whereby the rotational movement of the motor is transferred to each of the shafts 30 on the heat accumulators 5 by a gear or a link mechanism (not shown).

Each of the heat recovery units can be equipped with sensors 55–57 which sense the temperature as described above in connection with FIG. 1. However, it is also appropriate that common sensors 55–57 and a single control unit 60 are arranged for both of the heat recovery units in order to give control signals to the electric motors 62 or the electric motor. The control unit 60 can be connected to the control means.

It is also possible to couple together more than two heat recovery units to make a larger heat recovery assembly.

Figure 3:
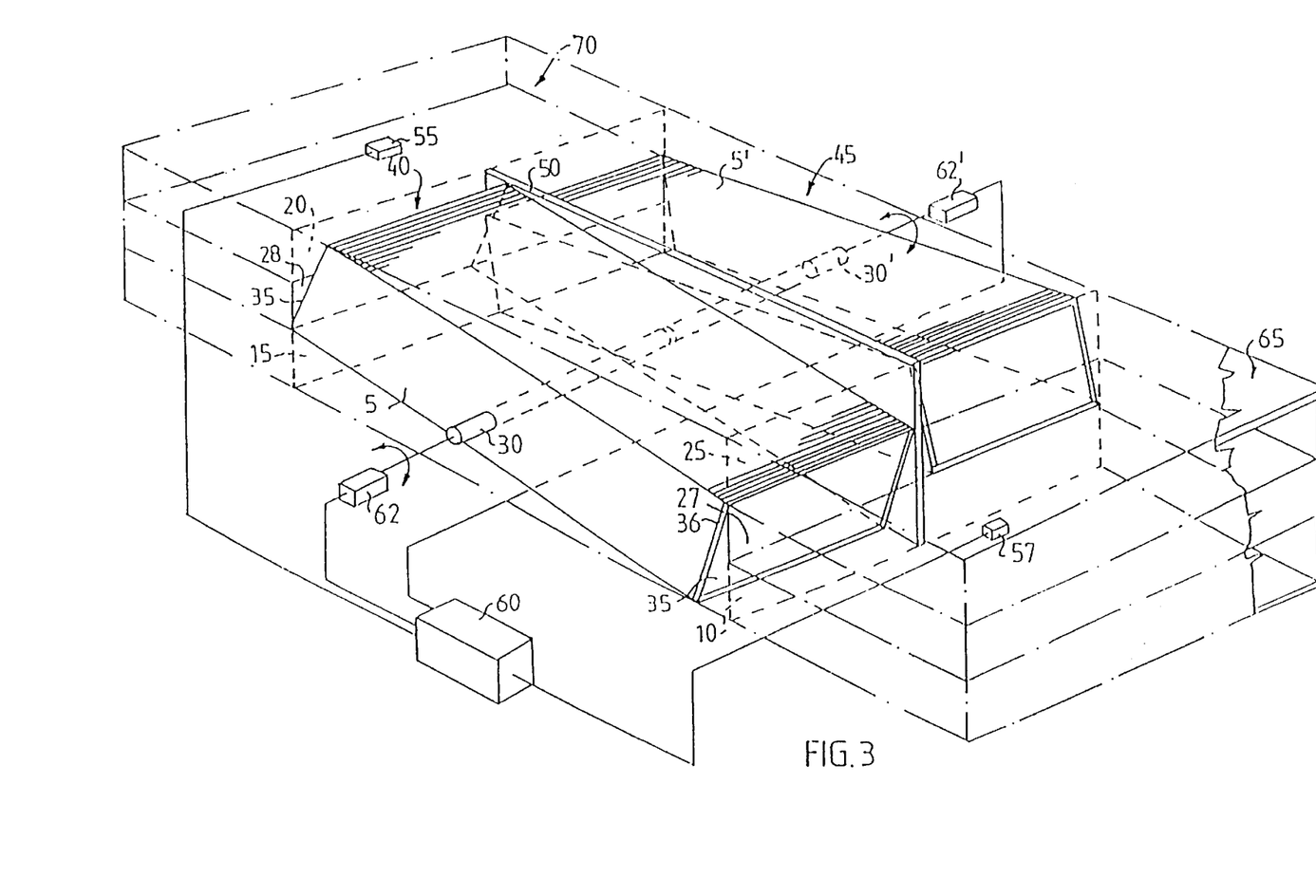
FIG. 3 shows a perspective view of a heat recovery unit according to a second embodiment.

FIG. 3 shows a perspective view of a heat recovery unit according to a second embodiment. The casing 1 contains in this second embodiment two heat accumulators 5,5', which are placed side by side in each of their own chambers 40,45. The chambers 40,45 are separated from each other by means of a wall 50. The casing 1 has a supply air opening 10, an exhaust air opening 15, an exterior air opening 20 and a used-air opening 25, which each cooperate with the end faces 35 of the heat accumulator 5 and 5', respectively. Each of the openings 10–25 is connected to both chambers 40,45, which means that each opening 10–25 extends from the first chamber 40 to the second chamber 45. The supply air opening 10 and the used-air opening 25 resp. the exhaust air opening 15 and the exterior air opening 20 are separated by means of the wall part 27 resp. 28, which can be formed as part of the casing 1.

A fan part 65 which comprises two fans 66,67 (FIG. 4) can be connected to the supply air opening 10 and the used-air opening 25, and a filter part 70 which comprises two filters 71, 72 (FIG. 4) can be connected to the exhaust air opening 15 and the exterior air opening 20.

Precisely as in the heat recovery assembly according to FIG. 2, the rotational movements of the heat accumulators 5,5' are so controlled that when the first heat accumulator 5 is in the first position for exhaust air throughflow, the second heat accumulator 5' is in the second position for exterior air throughflow, and vice versa.

Consequently, the ventilation in, for example, a building can be increased whereby a near enough continuous ventilation of the building is achieved. Each of the heat accumulators 5,5' can, as in FIG. 2, be equipped with its own stepping motor 62,62', which brings about the rotational movement of each heat accumulator 5,5'. The motors 62,62' shall in this case be synchronized so that when the first heat accumulator 5 is in the first position, the second heat accumulator 5' shall be in the second position and vice versa. This synchronization can take place by a control unit 60. Alternately, the heat recovery unit can be equipped with only one motor, where the rotational movement of the motor is transmitted to each of the shafts of the heat accumulators by a gear or link mechanism (not shown).

During exhaust air throughflow when the first heat accumulator 5 is set in the first position, air at room temperature in the form of exhaust air flows in through the exhaust air opening 15 and into the first chamber 40, in which the first heat accumulator 5 is positioned. The exhaust air flows subsequently through the heat accumulator 5 in a direction which essentially corresponds to the direction of its thickness. The heat accumulator 5 is thereby heated up by the throughflowing exhaust air. The air then flows out through the used-air opening 25 in the form of used air och consequently leaves the first chamber 40. The used air which leaves the user-air opening 25 can then suitably flow into a channel 82 (FIG. 5), which transports the air out of the building.

At the same time as exhaust air throughflow takes place in the first chamber 40, exterior air throughflow takes place in the second chamber 45, in which the second heat accumulator 5' is set in the second position for exterior air throughflow. During exterior air throughflow exterior air flows in through the exterior air opening 20 and into the second chamber 45. The exterior air then flows though the second heat accumulator 5' in a direction which essentially coincides with the direction of its thickness. The exterior air is thereby heated up by the second heat accumulator 5' which earlier has been warmed up by exhaust air during exhaust air throughflow. The air then flows out through the supply air opening 10 in the form of supply air and consequently leaves the second chamber 45. The supply air which leaves the supply air opening 10 then flows either directly into the building or into a tube system which distributes the air to the different rooms in the building (not shown).

According to this embodiment according to FIG. 3, a control means for controlling the heat recovery unit can be constructed so that a first sensor 55 senses the temperature of the exterior air which is flowing into the exterior air opening 20. The first sensor 55 is connected to a control unit 60, and is compensated, which means that it gives signals to the control unit 60 which signals are the basis for how the heat recovery unit is to be regulated at different exterior temperatures. A second sensor 57 which is placed by the supply air opening 10 and connected to the control unit 60 senses the temperature of the warmed up supply air which leaves the supply air openings 10 of the respective chamber 40,45. This second sensor 57 is regulated, which means that it gives signals to the control unit 60 which signals are a basis for how the heat recovery unit should be regulated with respect to a suitably installed desired value which is programmed into the control unit. When the supply air temperature is below the desired value of the second sensor 57, the control unit 60 gives a signal to the respective stepping motor 62,62', which are connected to the respective shaft 30,30' of the heat accumulators 5,5', whereby the first motor 62 rotates the first heat accumulator 5 to the second position for exterior air throughflow. At the same time the second stepping motor 62' rotates the second heat accumulator 5' to the first position for exhaust air throughflow.

As an alternative the first sensor 55 senses the temperature of the used air which leaves the used-air openings 25 of the respective chamber 40,45. A reference sensor can, for example, be placed in the building which is to ventilated, in order to sense the room temperature in the building. The first sensor 55 and the reference sensor are connected to the control unit 60. The second sensor 57 is placed by the supply air openings 10 of the respective chamber 40,45 and is connected to the control unit 60, whereby the second sensor 57 senses the temperature of the warmed up supply air. When the difference between the temperatures sensed by the first and second sensors 55 resp. 57 and the temperature sensed by the reference sensor 56 reaches a predetermined value, the control unit 60 gives a signal to the first and second stepping motors 62,62', whereby the first motor 62 rotates the first heat accumulator 5 to the second position for exterior air throughflow. At the same time the second stepping motor 62' rotates the second heat accumulator 5' to the first position for exhaust air throughflow.

FIG. 4 shows a lateral view of a heat recovery unit according to the second embodiment. The first heat accumulator 5 is shown with a plurality of parallel lines which extend in the direction of thickness of the first heat accumulator 5. The parallel lines symbolize that the first heat accumulator 5 is built up by a plurality of plates 37. The solid arrows show exhaust air flows through the heat recovery assembly. The first heat accumulator 5 is set in the first position for the exhaust air throughflow, wherein exhaust air flows through the exhaust air opening 15 into the first chamber 40, through the first heat accumulator 5 and out through the used-air opening 25 in the form of used air.

The second heat accumulator 5' is hidden behind the wall 50 which separates the first and second chambers 40,45, thus the contours of the second heat accumulator are only shown with dashed lines. The second heat accumulator 5' is set in the second position for exterior air throughflow which is shown with dashed arrows.

A fan part 65 which comprises two fans 66, 67 is connected to the supply air opening 10 and the used-air opening 25, and a filter part 70 which comprises two filters 71, 72 is connected to the exhaust air opening 15 and the exterior air opening 20.

Figure 5:
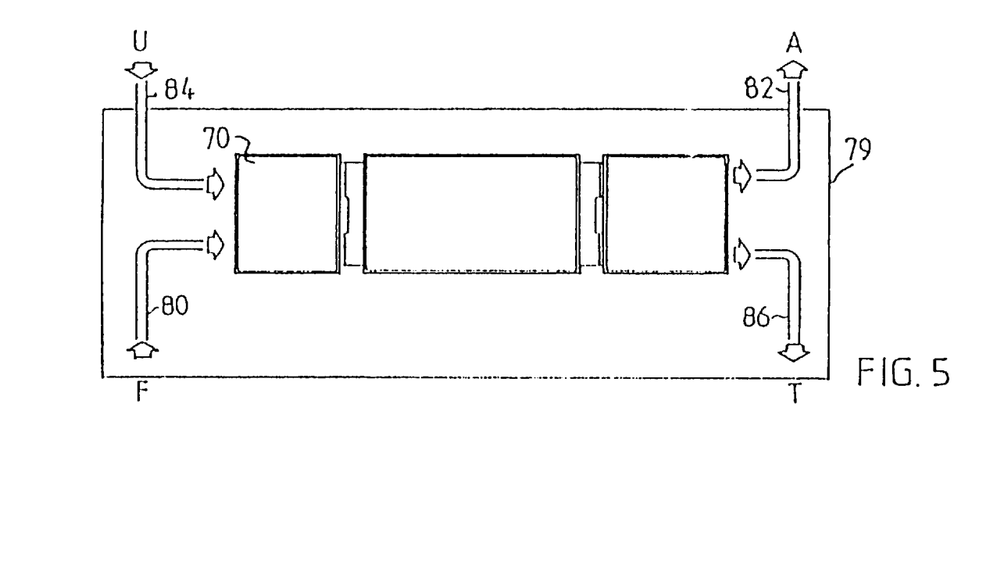
FIG. 5 shows an example of the application of heat recovery unit according to the second embodiment.

FIG. 5 shows an example of the application of a heat recovery unit according to the second embodiment. The heat recovery unit can, for example, be placed in an isolated place in a building 79. However, it is also possible to place the heat recovery unit outside the building 79. Exhaust air F in the form of the interior air of the building 79 is led through an exhaust air channel 80 into the filter part 70 of the heat recovery unit and further in through the exhaust air opening 15 to one of the two chambers 40 alt. 45, which each contain a heat accumulator 5,5'. The exhaust air passes through one of the heat accumulators 5 alt. 5' and out through the used-air opening 25 in the form of used air A which is led through a used-air channel 82 in order to be let out outside the building 79. At the same time, exterior air U is led through an exterior air channel 84 into the filter part 70 of the heat recovery unit and further in through the exterior air opening 20 to the second one of the two chambers 40 alt. 45. The exterior air passes through the second of the two heat accumulators 5 alt. 5' and out through the supply air opening 10 in the form of supply air T, which is led through a supply air channel 86 in order to be let into the building 79.

Figure 6:
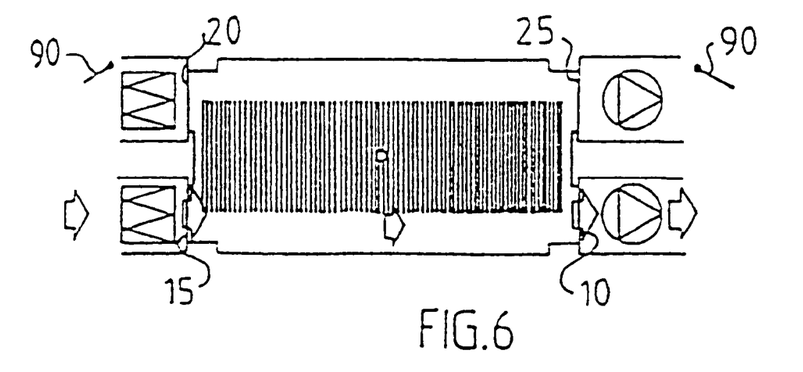
FIG. 6 shows a side view of a heat recovery unit according to the second embodiment in a third position.

FIG. 6 shows a heat recovery unit according to FIG. 4 where both the first and the second heat accumulators 5,5' are in a third position, in which position either of the openings 10–25 in the casing 1 of the heat recovery unit are closed by means of the end faces 35 of the heat accumulators 5,5'. On the other hand, both the exterior openings 20 and the used-air openings 25 are closed by means of valve leaves 90 which prevent exterior air to flow from the exterior air opening 20 and the exhaust air opening 25 to the supply air opening 10. In the third position, exhaust air can flow from the exhaust air opening 15 to the supply air opening 10 without passing through the heat accumulators 5,5', whereby an internal air circulation in, for example, a building can be achieved. The third position can be taken during, for example, a power cut or during night or weekend stoppages, when the stepping motors which bring about the rotational movement of the heat accumulators 5,5' can be so designed that they automatically rotate the heat accumulators 5,5' to the third position during shutdowns.

Figure 7:
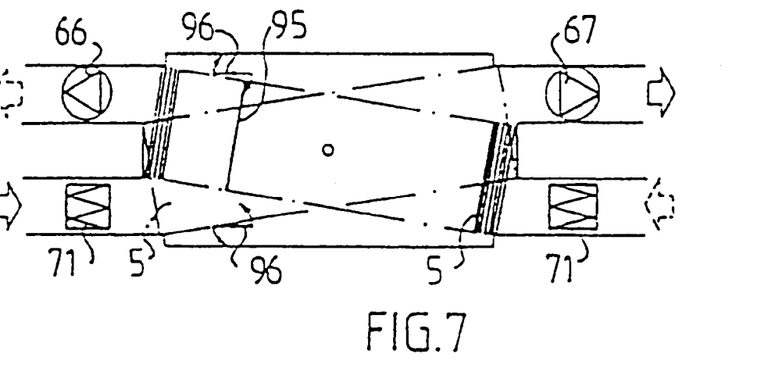
FIGS. 7–8 show side views of a heat recovery unit according to a third embodiment in two different positions.

FIG. 7 shows a lateral view of a heat recovery unit according to a third embodiment. The first heat accumulator 5 here is tipped into the second position for exterior air throughflow. At the same time the second heat accumulator 5' is topped into the first position for exhaust air throughflow. Each of the heat accumulators 5,5' is partitioned with a dividing wall 95, which extends in the direction of thickness of the heat accumulators 5,5', whereby this dividing wall 95 cooperates with valve leaves 96, which are synchronized with the rotational movement of the associated heat accumulator 5,5'. This synchronization can, for example, be achieved by means of a link system (not shown). The dividing wall 95 and the valve leaves 96 can together cooperate in order to minimize the losses in the heat recovery when the heat accumulators 5,5' rotate from the first to the second position, and vice versa. Another object of the dividing wall 95 and the valve leaves 96 will be explained in connection with FIG. 8.

Figure 8:
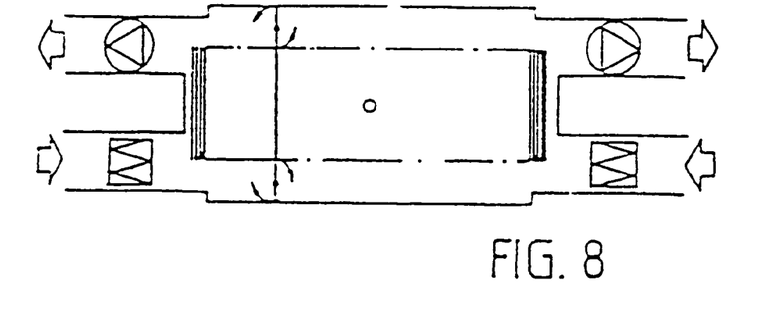

FIG. 8 shows a heat recovery unit according to FIG. 7, where both the first and the second heat accumulators 5,5' are in a third position, in which position none of the openings 10–25 in the casing 1 of the heat recovery unit are closed by means of the end faces 35 of the heat accumulators 5,5'. By means of the dividing wall 95 and the valve leaves 96, however, two, from each other separated, essentially airtight spaces are formed on each side of the dividing wall 95 and the valve leaves 96. Consequently, exhaust air can flow through the exhaust air opening 15 and out through the supply air opening 10, whereby a recycle air function in the form of an internal air circulation is achieved in, for example, a building. As described in connection with FIG. 6, the third position can be taken during, for example, power failures.

In the summer months when the exterior air temperature is relatively high, the accumulator 5,5' in the heat recovery unit can remain in either the first or the second position for a long time. A time function built into the control unit 60 can then "exercise" the rotational function at regular time intervals, for example one rotation or tipping per day, whereby the movable parts of the heat recovery unit are brought into motion in order to prevent them from sticking.

An advantage of the heat recovery unit according to the invention is that it can beapplied at a long distance from an outer wall in a building, as the air the whole time flows in the same direction in the channels 80–86 which are connected to the heat recovery unit.

Another advantage of the heat recovery unit is that if the rotating shaft 30 of the heat accumulator 5,5' is placed horizontally, exhaust air will flow essentially upwards through the heat accumulator 5,'. This means that water which condenses on the heat absorbing surfaces of the heat accumulator 5,' will stay there and in the second position of the accumulator will be absorbed by the exterior air which flows through the heat accumulator 5,5'. Consequently, no thaw water piping for the heat recovery unit is required. The efficiency of the heat recovery unit is also increased in this way because latent heat, which from the beginning is contained in the water vapor, is recovered.

Yet another advantage of the heat recovery unit according to the invention is that the heat accumulator 5,5,' is easy to clean because the throughflow direction of the air though the heat accumulator 5,5' occurs essentially in the direction of its thickness which is considerably less than its length and width, so that the throughflow channels are short och easy to clean by e.g. by rinsing with water.

Yet another advantage of the heat recovery unit according to the present invention is that the sound change during the change from the exterior air throughflow to the exhaust air throughflow and vice versa is very low. According to the invention, air flows the whole time in the same direction through the openings 10–25 in the casing 1 and in the channels 80–86 which are connected thereto, which means that the sound change is low because no large air volume has to change direction of flow.

Yet another advantage of the heat recovery unit according to the present invention is that the pressure drop over the heat accumulator 5,5' is low because the path of the air through the heat accumulator 5,5' is relatively short. This means that a lower fan capacity is required in order to produce the flow of the air and it also means a lower sound level.

It has been described above how heat can be recovered by the heat recovery unit according to the invention. It is, however, possible by means of the heat recovery unit to shut out warm air from, for example, a building in which the indoor temperature should be less than the outdoor temperature. The heat recovery unit will then work the other way round, whereby warm exterior air will give off its heat to the heat accumulator 5 alt. 5' which has been cooled by the exhaust air throughflow. The exterior air will thus be cooled down and flow into the rooms of the building in the form of cool supply air.

I claim:

1. Heat recovery unit comprising a casing (1) which encloses at least one regenerative heat accumulator (5), whereby the casing (1) has a supply air opening (10), an exhaust air opening (15), an exterior air opening (20) and a used-air opening (25), and whereby exhaust air and supply air alternately pass through the heat accumulator (5), characterized in that the heat accumulator (5), by means of a rotational movement, has a valve function which opens and respectively closes said openings (10–25) when the heat accumulator (5) rotates from a first position for exhaust air throughflow to a second position for exterior air throughflow, in that the heat accumulator rotates around a shaft (30), and in that the heat accumulator (5), in a direction essentially parallel with the shaft (30), has end faces (35), which in the first position cover a first pair of said openings (10–25) at the same time as a second pair of said openings (10–25) are open, and in the second position cover the second pair of openings (10–25) at the same time as the first pair of openings (10–25) are open.

2. Heat recovery unit according to claim 1, characterized in that the heat accumulator (5) has a length, a width and a thickness, of which the thickness is considerably less than the length, whereby the exhaust air and supply air pass through the heat accumulator (5) in the direction of its thickness.

3. Heat recovery unit according to claim 2, characterized in that the shaft (30) extends essentially perpendicular to the direction of the thickness, suitably also perpendicular to a longitudinal direction.

4. Heat recovery unit according to claim 1, characterized in that the first pair of openings (10–25) are made up of the exterior air opening (20) and the supply air opening (10), and that the second pair of openings are made up of the exhaust air opening (15) and the used-air opening (25).

5. Heat recovery unit according to claim 1, characterized in that the end faces (35) of the heat accumulator (5) are essentially planar, and that the casing (1) has ends in which the openings (10–25) are positioned which ends are essentially planar.

6. Heat recovery unit according to claim 1, characterized in that the end faces (35) have sealing strips (36) which cooperate with the ends of the casing (1).

7. Heat recovery unit according to claim 1, characterized in that the heat accumulator (5) can be placed in a third position where exhaust air can flow from the exhaust air opening (15) to the supply air opening (10), whereby valve leaves (90) prevent airflow through the exterior air opening (20) and the used-air opening (25).

8. Heat recovery unit according to claim 1, characterized in that the exhaust airflow and a exterior airflow are arranged to flow in opposite directions through the heat accumulator (5).

9. Heat recovery unit according to claim 2, characterized in that the heat accumulator (5) is divided by means of a dividing wall (95) which extends in the direction of the thickness of the heat accumulator (5), whereby the dividing wall cooperates with valve leaves (96) which are synchronized with the rotational movement of the heat accumulator (5) in such a way that, when the heat accumulator is in a third position, two separate essentially airtight spaces are formed on each side of the dividing wall (95) and the valve leaves (96).

10. Heat recovery unit according to claim 1, characterized in the a first sensor (55) is arranged at the used-air opening (25) in order to sense that temperature of used air, that a second sensor (57) is arranged at the supply air opening (10) in order to sense the temperature of the supply air, and that a reference sensor (56) is arranged in an air volume which is intended to be ventilated, in order to sense the temperature of the air volume, whereby the first and the second sensors (55,57) and the reference sensor (56) each are connected to a control unit (60) which controls the rotational movement of the heat accumulator (5), based on the temperature which each of the sensors (55–57) senses.

11. Heat recovery unit according to claim 1, characterized in that the number of heat accumulators (5) is two, that the accumulators are placed each in their own chambers (40,45) inside the casing, that the chambers (40,45) are separated from each other by means of a wall (50), that each of the openings (10–25) is connected with both chambers, and that the rotational movement of the heat accumulators (5,5') is so controlled that, when the first heat accumulator (5) is in the first position, the second accumulator (5') is in the second position, and vice versa.

12. Heat recovery unit according to claim 1, characterized in that a fan part (65) which comprises two fans (66,67) is connected to the supply air opening (10) and to the used-air opening (25), and that a filter part (70) which comprises two filters (71,72) is connected to the exhaust air opening (15) and to the exterior air opening (20).

13. Heat recovery assembly, characterized in that two heat recovery units according to claim 1 are coupled together so that the openings (10–25) of the respective heat recovery unit are joined to each other, and that the rotational movements of the heat accumulators (5) are so controlled that when the heat accumulator (5) in one of the heat recovery units is in the first position, the other heat accumulator (5') in the second heat recovery unit is in the second position, and vice versa.

* * * * *